(12) United States Patent
Yamaguchi et al.

(10) Patent No.: US 11,477,384 B2
(45) Date of Patent: Oct. 18, 2022

(54) INFORMATION PROCESSING APPARATUS, IMAGING APPARATUS, INFORMATION PROCESSING METHOD, CONTROL METHOD FOR IMAGING APPARATUS, AND STORAGE MEDIUM FOR NOTIFYING OF A SUBJECT BLUR OCCURING IN A CAPTURED IMAGE

(71) Applicant: CANON KABUSHIKI KAISHA, Tokyo (JP)

(72) Inventors: Shota Yamaguchi, Tokyo (JP); Naoto Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/719,652

(22) Filed: Dec. 18, 2019

(65) Prior Publication Data

US 2020/0213528 A1 Jul. 2, 2020

(30) Foreign Application Priority Data

Dec. 28, 2018 (JP) .............................. JP2018-247851

(51) Int. Cl.
*H04N 5/232* (2006.01)
*G06T 7/20* (2017.01)

(52) U.S. Cl.
CPC ......... *H04N 5/232941* (2018.08); *G06T 7/20* (2013.01); *H04N 5/23216* (2013.01); *H04N 5/23222* (2013.01)

(58) Field of Classification Search
None
See application file for complete search history.

(56) References Cited

U.S. PATENT DOCUMENTS

| 2007/0230931 A1* | 10/2007 | Nomura | H04N 5/23222 |
| | | | 396/55 |
| 2009/0167877 A1* | 7/2009 | Imamura | H04N 5/2353 |
| | | | 348/222.1 |
| 2013/0135494 A1* | 5/2013 | Kim | H04N 5/232123 |
| | | | 348/333.01 |
| 2019/0253630 A1* | 8/2019 | Kojima | H04N 5/23258 |
| 2020/0213482 A1* | 7/2020 | Kobayashi | H04N 5/2329 |

FOREIGN PATENT DOCUMENTS

JP 2008-172667 A 7/2008

\* cited by examiner

*Primary Examiner* — Quan Pham
(74) *Attorney, Agent, or Firm* — Canon U.S.A., Inc. IP Division

(57) ABSTRACT

An information processing apparatus includes an acquisition unit configured to acquire a plurality of first captured images acquired in a plurality of first image capturing operations based on a first imaging parameter, and motion information for a subject in the plurality of first captured images, a setting unit configured to set a second imaging parameter, an estimation unit configured to estimate, based on the motion information and the second imaging parameter, a motion blur of a subject in a second captured image acquired when a second image capturing is performed based on the second imaging parameter and a notification unit configured to notify of the motion blur. The motion blur is a statistic of a motion blur in each of the plurality of first captured images.

20 Claims, 8 Drawing Sheets

PREPARATORY CAPTURED IMAGE

MOTION VECTOR

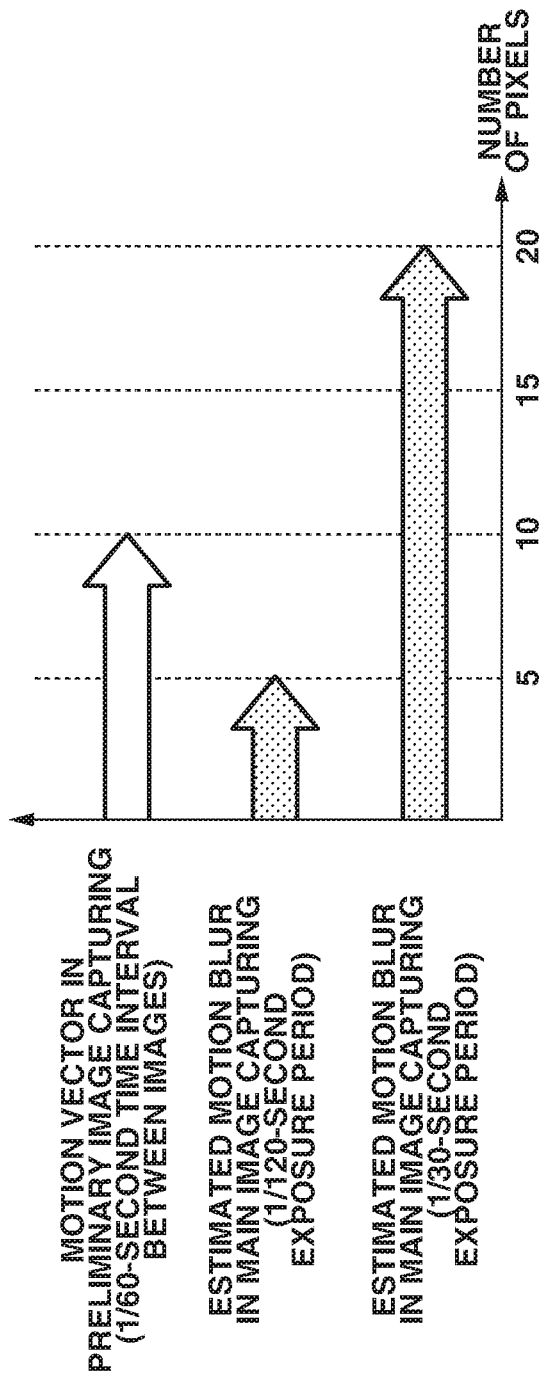

MOTION BLUR NOTIFICATION ICON

MOTION BLUR NOTIFICATION FRAME

MOTION BLUR NOTIFICATION EDGE

INFORMATION PROCESSING APPARATUS, IMAGING APPARATUS, INFORMATION PROCESSING METHOD, CONTROL METHOD FOR IMAGING APPARATUS, AND STORAGE MEDIUM FOR NOTIFYING OF A SUBJECT BLUR OCCURING IN A CAPTURED IMAGE

BACKGROUND OF THE INVENTION

Field of the Invention

The aspect of the embodiments relates to a technique for notifying of a subject blur occurring in a captured image.

Description of the Related Art

Japanese Patent Application Laid-Open No. 2008-172667 discusses a technique for enabling a user to visually check a motion area during preliminary image capturing. Preliminary image capturing refers to image capturing including framing adjustment and imaging condition setting while monitoring an electronic view finder or back liquid crystal display of an imaging apparatus. Japanese Patent Application Laid-Open No. 2008-172667 discusses a technique for detecting a motion area between time-sequential images captured during preliminary image capturing and highlighting the motion area.

However, even if the user visually checks the image displayed on the electronic view finder or back liquid crystal display during preliminary image capturing, it is very difficult for the user to check whether a motion blur will occur at a set shutter speed. More specifically, during preliminary image capturing, it is not easy to visually check a motion blur of, for example, a running person's limb displayed in a small display area.

SUMMARY OF THE INVENTION

According to an aspect of the embodiments, an information processing apparatus includes an acquisition unit configured to acquire first captured images acquired in first image capturing operations based on a first imaging parameter, and motion information for a subject in each of the first captured images, a setting unit configured to set a second imaging parameter, an estimation unit configured to estimate, based on the motion information and the second imaging parameter, a motion blur of a subject in a second captured image acquired when a second image capturing is performed based on the second imaging parameter and a notification unit configured to notify of the motion blur.

According to another aspect of the embodiments, an imaging apparatus includes an imaging unit configured to, upon issuance of an imaging instruction by a user during a sequential output of first captured images acquired in first image capturing operations based on a first imaging parameter, output a second captured image in a second image capturing based on a second imaging parameter based on the imaging instruction, a calculation unit configured to calculate motion information based on the first captured images output from the imaging unit, a setting unit to configured set the second imaging parameter, an estimation unit configured to estimate a motion blur in the second captured image based on the motion information and the second imaging parameter, and a notification unit configured to notify of the motion blur estimated by the estimation unit before accepting the imaging instruction.

According to yet another aspect of the embodiments, an information processing method includes acquiring first captured images acquired in first image capturing operations based on a first imaging parameter, and motion information for a subject in each of the first captured images, setting a second imaging parameter, estimating a motion blur of a subject in a second captured image acquired when a second image capturing is performed based on the second imaging parameter, based on the motion information and the second imaging parameter, and notifying of the motion blur.

According to yet another aspect of the embodiments, a method for controlling an imaging apparatus including an imaging unit configured to, upon issuance of an imaging instruction by a user during a sequential output of first captured images acquired in first image capturing operations based on a first imaging parameter, output a second captured image in a second image capturing based on a second imaging parameter based on the imaging instruction, includes calculating motion information based on the first captured images output from the imaging unit, setting the second imaging parameter, estimating a motion blur in the second captured image based on the motion information and the second imaging parameter, and notifying of the motion blur estimated by the estimation unit before accepting the imaging instruction.

Further features of the disclosure will become apparent from the following description of exemplary embodiments with reference to the attached drawings.

BRIEF DESCRIPTION OF THE DRAWINGS

FIG. 6 illustrates images of a motion vector and estimated motion blurs according to the first exemplary embodiment.

DESCRIPTION OF THE EMBODIMENTS

A first exemplary embodiment of the disclosure will be described below with reference to the accompanying drawings.

If the shutter speeds are different between main image capturing and preliminary image capturing, occurring motion blurs are also different from those between the main image capturing and the preliminary image capturing. Thus, it is difficult to check a motion blur to occur in main image capturing even after a visual check of an image occurring during preliminary image capturing. Assume an example case where an image of a running person, with which no blur has occurred in preliminary image capturing, is captured in main image capturing at a preset shutter speed different from that in preliminary image capturing. In such a case, since the shutter speed to be used in main image capturing is low with respect to the motion speed of the person, the image of the person may be blurred in an image recorded during the main image capturing. A similar situation occurs not only in a relation between the preliminary image capturing and the main image capturing but also in a plurality of image capturing operations where imaging parameters can be independently set.

In view of the above-described situation, the aspect of the embodiments makes it easier, when displaying a captured image of a subject acquired in the first image capturing, to check a motion blur of a subject occurring in image capturing using imaging parameters set independently of the first image capturing. A method according to the present exemplary embodiment estimates a motion blur which may occur in image capturing using imaging parameters set independently of the first image capturing, based on motion information of a subject acquired in the first image capturing, and notifies of the estimated motion blur.

Figure 1:
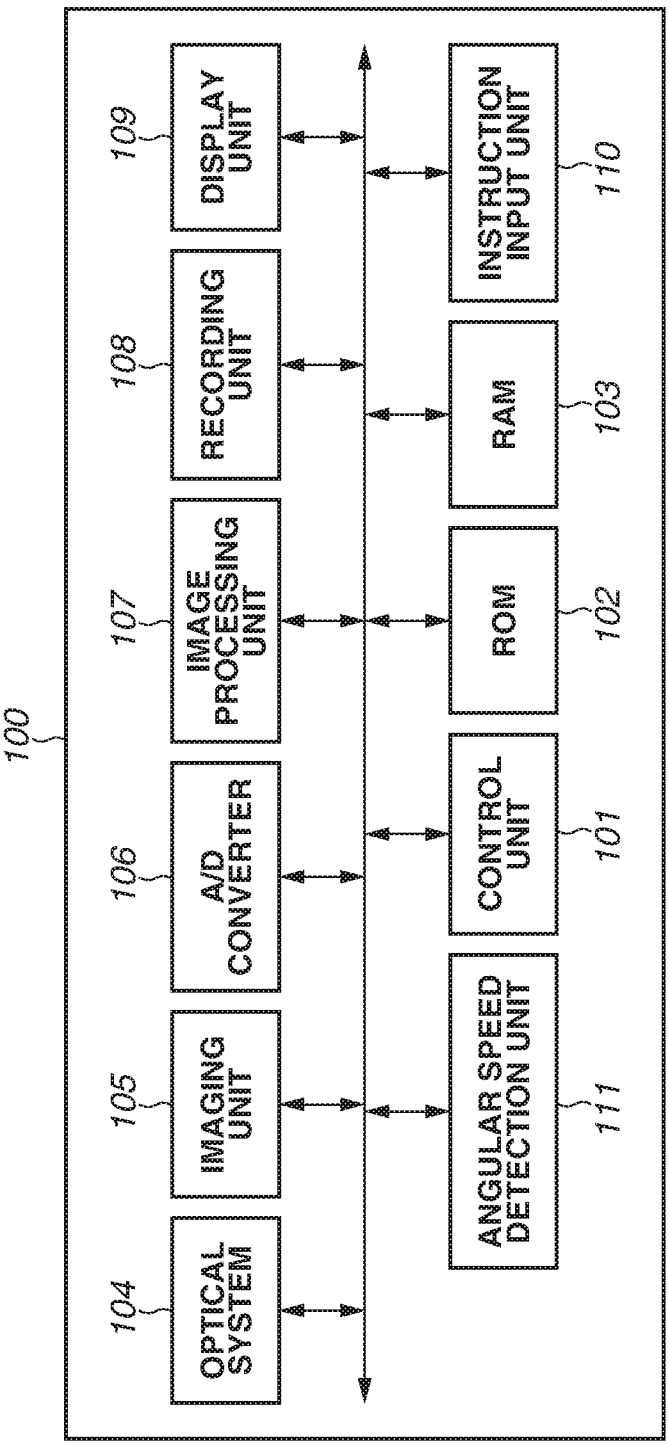
FIG. 1 is a block diagram illustrating an imaging apparatus according to a first exemplary embodiment.

FIG. 1 is a block diagram illustrating a digital camera having an imaging unit, as an example of an information processing apparatus and an imaging apparatus according to the present exemplary embodiment. An information processing apparatus according to the aspect of the embodiments is also applicable to any electronic apparatuses capable of processing a captured image. Samples of these electronic apparatuses include a cellular phone, a gaming machine, a tablet terminal, a personal computer, and a clock- and glasses-type information terminal. A control unit 101 is, for example, a central processing unit (CPU) that reads a control program for each block included in a digital camera 100 from a read only memory (ROM) 102 (described below), loads the program into a random access memory (RAM) 103, and then executes the program. Thus, the control unit 101 controls the operation of each block included in the digital camera 100.

The ROM 102, which is an electrically erasable and recordable nonvolatile memory, stores, for example, operation programs for blocks included in the digital camera 100 and parameters for operations of the blocks.

The RAM 103, which is a rewritable volatile memory, is used to load a program to be executed by the control unit 101 and temporarily store data generated in operations of the blocks included in the digital camera 100.

An optical system 104 has a lens group including a zoom lens and a focusing lens, and focuses a subject image on the imaging plane of an imaging unit 105 (described below).

The imaging unit 105 is, for example, a charge coupled device (CCD) sensor or complementary metal oxide semiconductor (CMOS) sensor. The imaging unit 105 photoelectrically converts an optical image focused on the imaging plane of the imaging unit 105 by the optical system 104, and outputs an acquired analog image signal to an analog-to-digital (A/D) converter 106.

The A/D converter 106 converts the input analog image signal into digital image data. The digital image data output from the A/D converter 106 is temporarily stored in the RAM 103.

An image processing unit 107 performs various image processing on the image data stored in the RAM 103. More specifically, the image processing unit 107 applies various processing for developing, displaying, and recording digital image data. The processing includes defect correction processing for pixel defects due to the optical system 104 and the image sensor, demosaicing processing, white balance correction processing, color interpolation processing, and gamma processing.

The image processing unit 107 includes a motion blur notification image generation unit 300. According to the present exemplary embodiment, the motion blur notification image generation unit 300 generates an image plane for easily checking a motion blur, based on acquired information about a motion blur of a subject. The motion blur notification image generation unit 300 superimposes the image plane on the image data stored in the RAM 103, and generates a blur notification image.

A recording/output unit 108 records data including image data in a removable recording medium (e.g., a memory card), and outputs data to an external apparatus via an external interface. The recording/output unit 108 records image data processed by the image processing unit 107, as a recorded image, via the RAM 103.

A display unit 109, which includes a display device such as a liquid crystal display (LCD), displays an image stored in the RAM 103 or in the recording/output unit 108 on the display device. The display unit 109 also displays an operation user interface for accepting an instruction from a user. The display unit 109 may include a plurality of display devices, such as an electronic view finder (EVF) and a back monitor on the photographer side (e.g., back side). The display unit 109 may simultaneously output images to the plurality of display devices, or selectively output an image to a selected display device.

An instruction input unit 110, which is an input interface including various physical operation members such as a touch panel and a shutter button, accepts an instruction input by the user.

An angular speed detection unit 111, such as an angular speed sensor, detects an angular speed of the main body of the digital camera 100 in yaw and pitch directions due to a camera shake and camera work. The angular speed detection unit 111 uses an existing angular speed detection method, and thus detailed descriptions will be omitted.

Under the control of the control unit 101, the digital camera 100 performs preliminary image capturing (e.g., live view imaging) for consecutively displaying analog image signals consecutively output from the imaging unit 105 via the A/D converter 106, the RAM 103, the image processing unit 107, and the display unit 109. During the preliminary image capturing, the digital camera 100 enables the user to prepare for main image capturing, in which recording to a recording medium and output to an external apparatus are performed. More specifically, the user can adjust the framing, and change imaging parameters of main image capturing, such as the exposure time (Tv value), aperture value (Av value), and International Standard Organization (ISO) sensitivity.

Processing of the digital camera 100 according to the present exemplary embodiment will be described in detail below with reference to the flowchart illustrated in FIG. 2. Each step of the flowchart is executed by the control unit 101 or each unit of the digital camera 100 based on instructions of the control unit 101.

In step S201, after the user turns on power of the digital camera 100, the control unit 101 controls the optical system 104 and the imaging unit 105 to start preliminary image capturing. During a preliminary image capturing period, the digital camera 100 consecutively captures and acquires images, and displays the acquired captured images on the display device of the display unit 109. The user can adjust the framing while checking the consecutively displayed preliminary captured images. Processing in steps S202, 203, 204, 205 and 206 (described below) is performed during the preliminary image capturing period.

In step S202, the user inputs imaging parameters for simulation by using the instruction input unit 110. The control unit 101 sets imaging parameters for simulation independently of imaging parameters for preliminary image capturing based on an input from the instruction input unit 110. The control unit 101 may automatically set, for example, imaging parameters considered to be suitable for a detected subject model by using known image analysis and subject analysis. According to the present exemplary embodiment, an exposure time can be set as an imaging parameter for simulation.

According to the present exemplary embodiment, imaging parameters for simulation set by the control unit 101 are used, as imaging parameters for main image capturing, after the depression of the shutter button (i.e., main image capturing instruction) is detected (described below). However, the aspect of the embodiments is not limited thereto. The control unit 101 may be configured to separately and independently set the parameters for main image capturing based on a user instruction, or to automatically set the parameters.

In step S203, the control unit 101 determines whether a motion blur notification is set to ON or OFF. A motion blur notification may be set, for example, by the user by using the instruction input unit 110, or may be automatically set based on a certain imaging condition. A motion blur notification may be set to ON or OFF by one physical operation member (e.g., a button, and a bar) or one icon on a touch device, and set to ON or OFF by the user at any timing during preliminary image capturing. Further, a motion blur notification may be alternately set to ON and OFF at certain intervals.

When the control unit 101 determines that a motion blur notification is set to ON (YES in step S203), the processing proceeds to step S204. In step S204, the motion blur notification image generation unit 300 generates a motion blur notification image including a preliminary captured image and a motion blur notification plane superimposed on the preliminary captured image. The motion blur notification plane notifies of a motion blur (or no motion blur) occurring on a subject when an image is captured based on the imaging parameters in main image capturing. In step S205, the control unit 101 displays the generated motion blur notification image on the display device of the display unit 109.

When the control unit 101 determines that a motion blur notification is set to OFF (NO in step S203), the processing proceeds to step S205. In step S205, the control unit 101 displays a preliminary captured image without a motion blur notification plane superimposed thereon.

In step S206, the control unit 101 determines whether the shutter button of the instruction input unit 110 is pressed by a user operation. If the digital camera 100 is configured to accept a 2-step input of the shutter button, including a half press for issuing a preliminary image capturing instruction and a full press for issuing a main image capturing instruction, the control unit 101 determines whether the full press is performed. If the digital camera 100 is configured to accept only a 1-step input of the shutter button, the control unit 101 determines whether the 1-step input is performed.

When the control unit 101 determines that the shutter button is not pressed (NO in step S206), the processing returns to step S202. The control unit 101 then repeats the processing in steps S202 to S205. This enables the user to easily check a motion blur occurring on a subject when main image capturing is performed based on the currently set imaging parameters even during preliminary image capturing. If the user determines that the motion blur is not satisfactory or does not want the motion blur to occur, the user can reset the shutter speed or exposure time for main image capturing without pressing the shutter button.

By notifying of the motion blur of the subject during preliminary image capturing, the user can repetitively set an exposure time of main image capturing, while checking the motion blur notification image displayed on the display unit 109, until a preferred motion blur is obtained. Then, the user can have the right timing for image capturing in a state where the exposure time corresponding to a suitable motion blur has been set.

When the control unit 101 determines that the shutter button is pressed (YES in step S206), i.e., the control unit 101 determines that a main image capturing instruction is received, the processing proceeds to step S207. In step S207, the control unit 101 controls the optical system 104 and the imaging unit 105 to perform main image capturing based on the imaging parameters set before preliminary image capturing. In step S208, the control unit 101 outputs an image obtained in main image capturing to the display unit 109 and the recording/output unit 108. The display unit 109 displays the image on the display device, and then the recording/output unit 108 records the image to a recording medium or outputs the image to an external apparatus.

An example of a configuration of the motion blur notification image generation unit 300 included in the image processing unit 107 characterizing the aspect of the embodiments will be described below with reference to FIG. 3.

Figure 3:
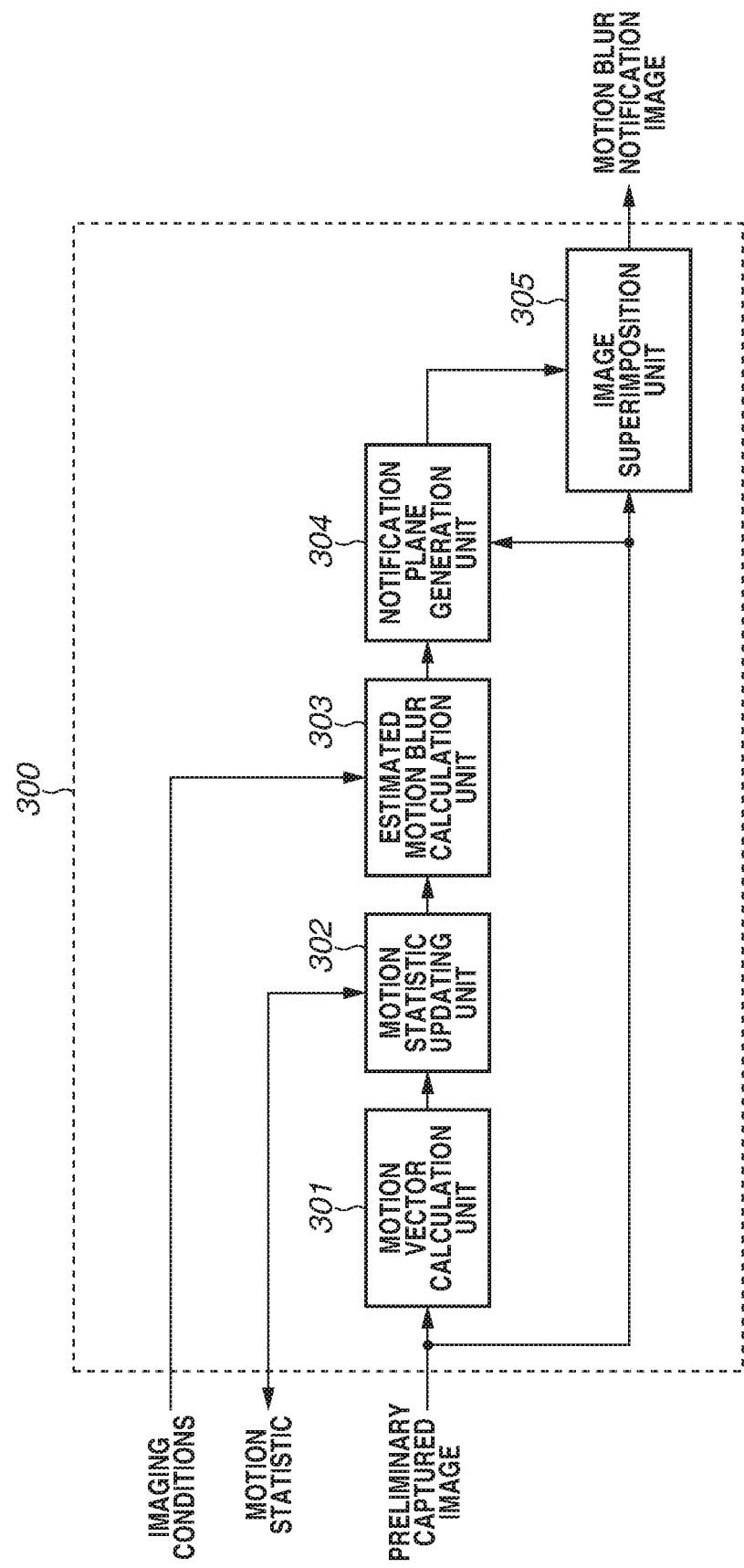
FIG. 3 is a block diagram illustrating an example of a configuration of a motion blur notification image generation unit according to the first exemplary embodiment.

FIG. 3 illustrates an example of a configuration of the motion blur notification image generation unit 300. The motion blur notification image generation unit 300 includes a motion vector calculation unit 301, which calculates motion vectors of a subject through the comparison between images, and a motion statistic updating unit 302, which updates a motion statistic based on the calculated motion vectors and a motion statistic stored in the RAM 103. The motion blur notification image generation unit 300 further includes an estimated motion blur calculation unit 303, which estimates a motion blur of a subject in main image capturing based on the updated motion statistic. The motion blur notification image generation unit 300 further includes a notification plane generation unit 304, which generates data for notifying of a motion blur based on the estimated motion blur of the subject, and an image superimposition unit 305, which performs processing for superimposing the motion blur notification plane on a captured image according to the present exemplary embodiment. Operations of each unit will be described in detail below.

One or more function blocks illustrated in FIG. 3 may be implemented by hardware such as an application specific integrated circuit (ASIC) and a programmable logic array (PLA) or implemented when a programmable processor such as a central processing unit (CPU) and a microprocessing unit (MPU) executes software. In addition, the function blocks may be implemented by a combination of software and hardware. Therefore, in the following descriptions, even if different function blocks are described as operating entities, these function blocks may be implementable by the same hardware entity.

Processing in which the blur notification image generation unit 300 generates a blur notification image in step S204 illustrated in FIG. 2 will be described in detail below with reference to the flowchart illustrated in FIG. 4. Each step of this flowchart is executed by the control unit 101, or each unit of the digital camera 100 including the motion blur notification image generation unit 300 according to instructions of the control unit 101.

In step S401, the control unit 101 inputs preliminary captured images consecutively captured by the imaging unit 105 and imaging parameters to be used in main image capturing to the motion blur notification image generation unit 300.

In step S402, the motion vector calculation unit 301 calculates motion vectors between preliminary captured images as subject's motion information, through image comparison processing. A motion vector is a vector representing the amount of movement of a subject between preliminary captured images. According to the present exemplary embodiment, the motion vector calculation unit 301 calculates motion vectors of a subject in a plane between two-dimensional images. However, the aspect of the embodiments is not limited thereto. For example, the motion vector calculation unit 301 may acquire depth information (e.g., subject distance, and defocus amount) of the subject in the depth direction in each preliminary captured image, and calculate motion vectors of the subject in the three-dimensional space.

By using a plurality of preliminary captured images as a base and a reference frame, the motion vector calculation unit 301 calculates a correlation with each block of a target area in the reference frame by using a base block in the base frame. As a result of the correlation calculation, the motion vector calculation unit 301 calculates motion vectors based on the positional relation between the block having the highest correlation and the base block. A correlation value calculation method is not particularly limited to any method including methods based on Sum of Absolute Difference, Sum of Difference Square, and Normal Cross-Correlation Value. The gradient method and other methods are applicable as a motion vector calculation method.

Figure 5A:
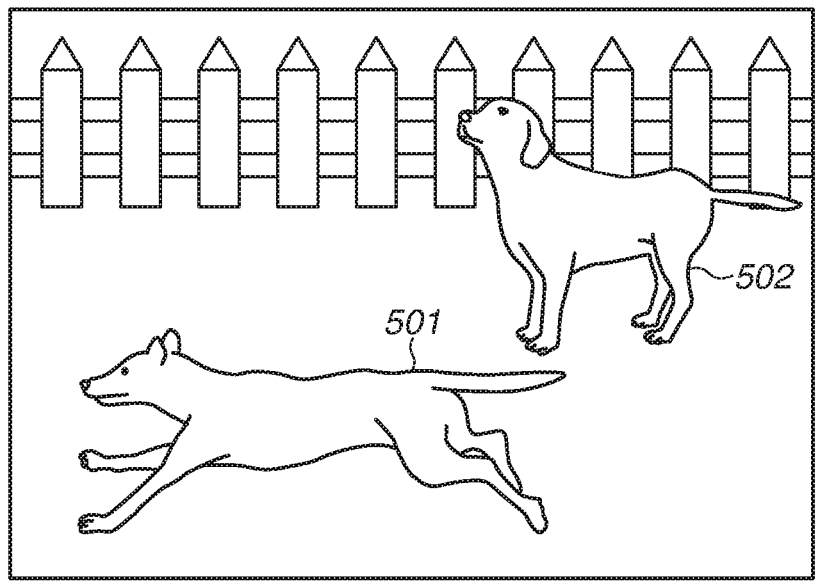
FIGS. 5A and 5B illustrate a preliminary captured image and motion vectors, respectively, according to the first exemplary embodiment.
Figure 5B:
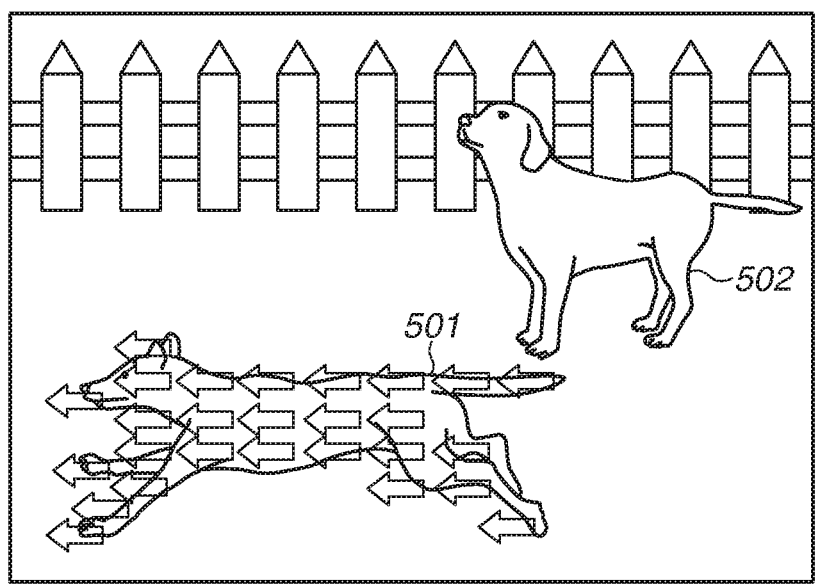

FIG. 5A illustrates a preliminary captured image of a dog 501 running to the left. FIG. 5B illustrates an image of motion vectors calculated at this timing. Referring to the example illustrated in FIG. 5B, motion vectors of the running dog 501 having a predetermined magnitude or more are detected as left-directional motion vectors. Motion vectors of a dog 502 at rest and the background fence have a magnitude of zero or smaller than a predetermined value.

The motion vector calculation unit 301 may calculate motion vectors in every predetermined pixel unit instead of calculating motion vectors of all pixels.

In step S403, the motion statistic updating unit 302 performs processing for updating the motion statistic based on the calculated motion vectors and the motion statistic stored in the RAM 103. The statistic refers to a time-sequential statistic, i.e., a statistic based on the history of past motion vectors.

The update processing illustrated in step S403 performed by the control unit 101 and the motion statistic updating unit 302 will be described below with reference to the flowchart illustrated in FIG. 8. Each step of this flowchart is performed by the control unit 101, or each unit of the digital camera 100 including the motion statistic updating unit 302 based on an instruction of the control unit 101.

Figure 8:
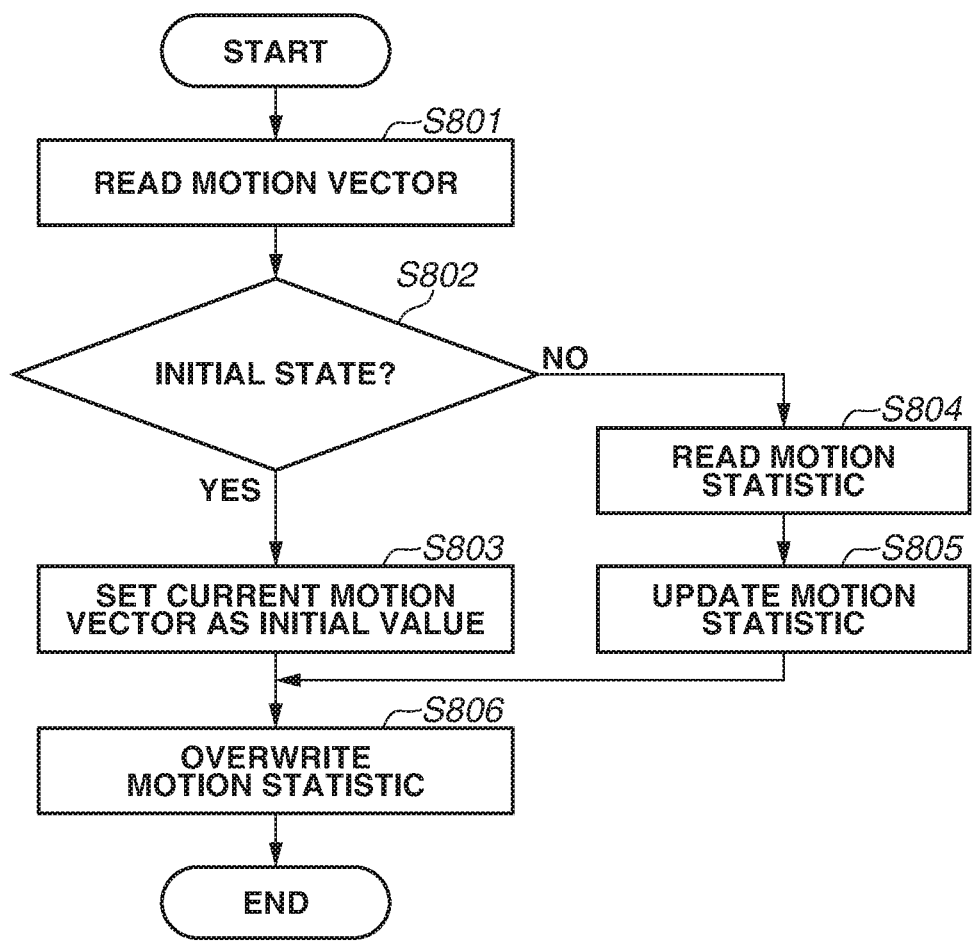
FIG. 8 is a flowchart illustrating processing for generating a motion blur notification image according to a second exemplary embodiment.

In step S801 illustrated in FIG. 8, the control unit 101 reads motion vectors. The read motion vectors are current motion vectors calculated by the motion vector calculation unit 301.

In step S802 illustrated in FIG. 8, the control unit 101 determines whether the motion statistic is in the initial state. The initial state refers to a state where no history of past motion vectors exist. If the control unit 101 determines that the motion statistic is in the initial state (YES in step S802), the processing proceeds to step S803. In step S803, the control unit 101 sets the current motion vectors as initial values. On the other hand, if the control unit 101 determines that the motion statistic is not in the initial state (NO in step S803), the processing proceeds to step S804. In step S804, the control unit 101 performs processing for reading the motion statistic stored in the RAM 103. In step S805, the control unit 101 performs processing for updating the motion statistic.

A method for updating the motion statistic differs depending on how the motion statistic is calculated. According to the present exemplary embodiment, the motion statistic is calculated as the maximum value of the magnitudes of motion vectors for past N frames, where N is an integer equal to or larger than 2. The larger the integer N, the larger becomes the influence of past motions on the motion statistic.

The motion statistic is updated according to the following formula (1).

$$\mathrm{MOV\_TOT=MAX(MOV\_PRE,MOV\_CUR)} \qquad (1)$$

Referring to the formula (1), MOV_PRE denotes the past motion statistic, and MOV_CUR denotes the magnitudes of the current motion vectors. In the following update processing, the control unit 101 performs the calculation of the formula (1) assuming the maximum value as a new motion statistic MOV_TOT. The control unit 101 performs the processing for calculating the motion statistic based on the formula (1) in units of motion vector calculation. According to the present exemplary embodiment, the control unit 101 performs the update processing in pixel units since it calculates motion vectors in pixel units. If the control unit 101 calculates motion vectors in block units with a predetermined size, the control unit 101 performs the update processing in the block units.

In step S806 illustrated in FIG. 8, the control unit 101 overwrites the motion statistic updated in step S805 in the RAM 103, and the processing of the flowchart ends. If the control unit 101 determines that the motion statistic is in the initial state (YES in step S802), the control unit 101 stores the current motion vectors as initial values, and the processing of the flowchart ends.

Figure 4:
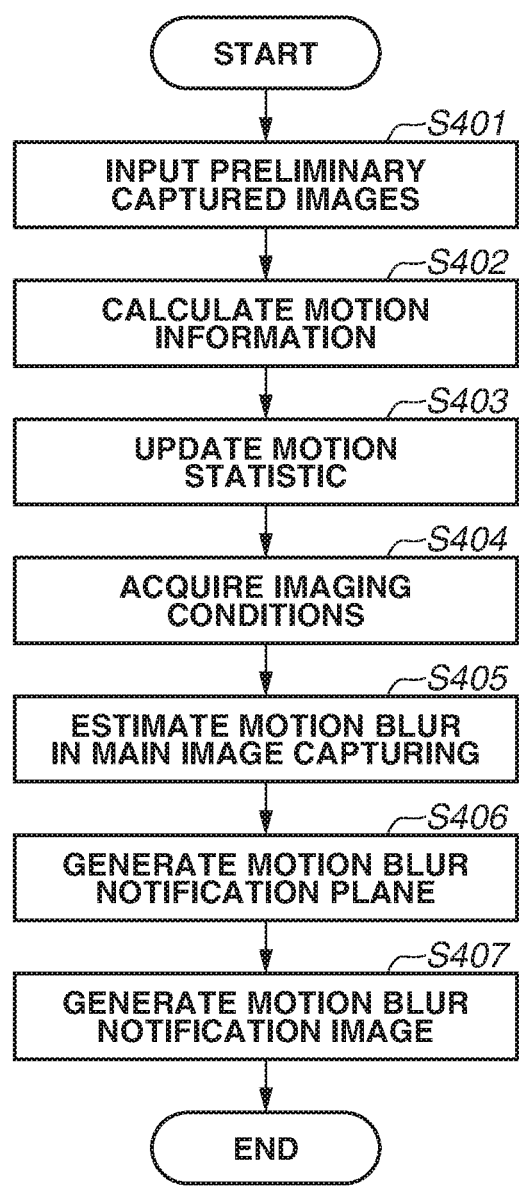
FIG. 4 is a flowchart illustrating processing for generating a motion blur notification image according to the first exemplary embodiment.

In step S404 illustrated in FIG. 4, the estimated motion blur calculation unit 303 acquires, as imaging conditions, the exposure time of main image capturing and the inter-image time interval (e.g., frame rate) in preliminary image capturing. The exposure time and the inter-image time interval have been set as imaging conditions in step S202 illustrated in FIG. 2.

In step S405, the estimated motion blur calculation unit 303 estimates a motion blur of the subject in main image capturing based on the motion vectors in pixel units calculated in step S302, based on the exposure time in main image capturing and the inter-image time interval in preliminary image capturing acquired in step S404.

The method for estimating a motion blur of a subject in main image capturing will be described in detail below with reference to FIG. 6. FIG. 6 illustrates a relation between motion vectors in preliminary image capturing and an estimated motion blur estimated for a motion blur in main image capturing. FIG. 6 illustrates examples of imaging conditions including a ⅟60-second inter-image time interval in preliminary image capturing, and a ⅟120- and a ⅟30-second exposure time in main image capturing.

The estimated motion blur calculation unit 303 estimates motion vectors in pixel units as a motion blur in main image capturing based on conversion formulas as the following Formulas (2) and (3).

$$CONV\_GAIN = EXP\_TIME / INT\_TIME \quad (2)$$

$$CONV\_BLUR = VEC\_LEN * CONV\_GAIN \quad (3)$$

Referring to the formula (2), CONV_GAIN denotes an estimated gain for converting the magnitude of motion vectors in preliminary image capturing into the magnitude of motion vectors in main image capturing. EXP_TIME denotes an exposure time in main image capturing. INT_TIME denotes an inter-image time interval in preliminary image capturing. Referring to the formula (3), CONV_BLUR denotes a motion blur of a subject in main image capturing, and VEC_LEN denotes the magnitude of motion vectors in preliminary image capturing.

Referring to the formula (2), the estimated motion blur calculation unit 303 calculates an estimated gain by dividing the exposure time in main image capturing by the inter-image time interval in preliminary image capturing. Referring to the formula (3), the estimated motion blur calculation unit 303 calculates a motion blur of the subject in main image capturing by multiplying the magnitude of motion vectors by the estimated gain.

More specifically, when the length of motion vectors in preliminary image capturing is 10 pixels as illustrated in FIG. 6, an estimated motion blur for a $\frac{1}{120}$-second exposure time in main image capturing becomes 5 pixels since the estimated gain is halved. An estimated motion blur for a $\frac{1}{30}$-second exposure time in main image capturing becomes 20 pixels since the estimated gain is doubled.

In step S406, the notification plane generation unit 304 generates an image plane for notifying of a motion blur based on the motion blur in pixel units calculated in step S405. For example, the notification plane generation unit 304 generates an image plane for distinguishably notifying of pixels corresponding to a motion blur having a predetermined blur amount.

Figure 2:
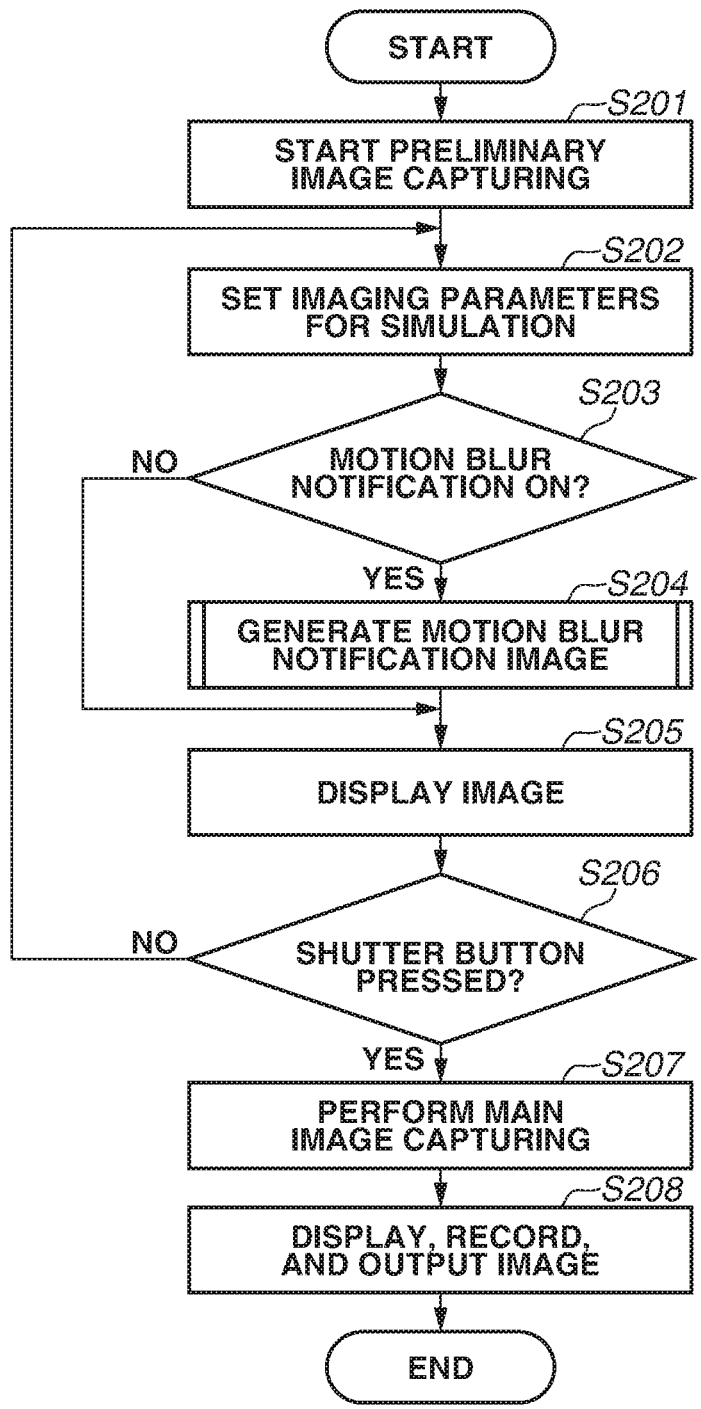
FIG. 2 is a flowchart illustrating imaging processing of a digital camera according to the first exemplary embodiment.

During a period between the timing when the depression of the shutter button is detected in step S206 illustrated in FIG. 2 and the timing when main image capturing is performed, the user can change imaging parameters such as the shutter speed to obtain a captured image in main image capturing that has a desired motion blur. When an imaging parameter is changed, the estimated motion blur calculation unit 303 performs a motion blur estimation again. The notification plane generation unit 304 re-generates an image plane based on the re-estimated motion blur.

In step S407, the image superimposition unit 305 superimposes the notification plane generated in step S405 on the preliminary captured image, for example, in the RAM 103 to generate a blur notification image.

Figure 7A:
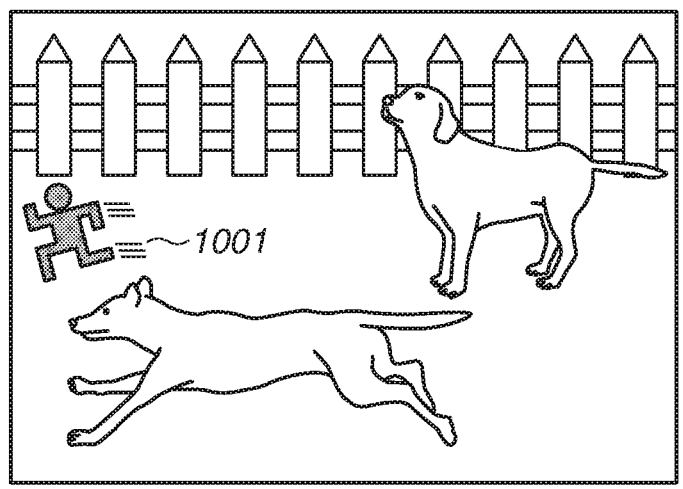
FIGS. 7A, 7B and 7C illustrate a motion blur notification method according to the first exemplary embodiment.
Figure 7B:
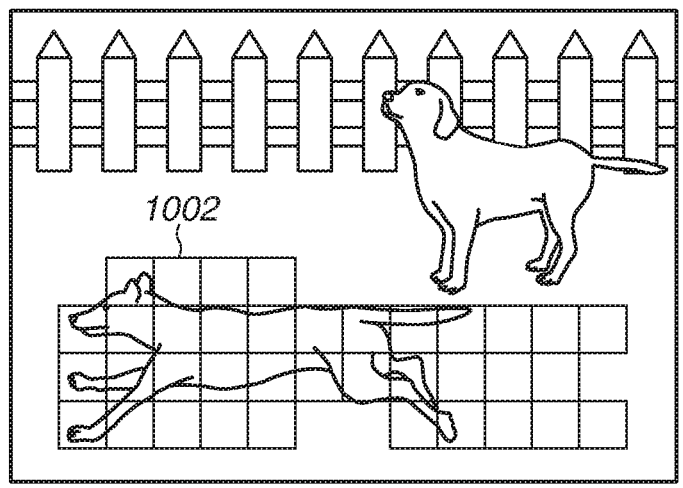
Figure 7C:
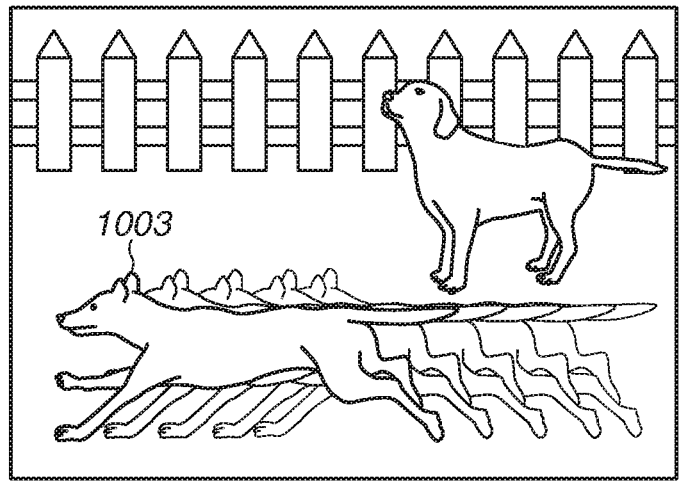

A method for generating a notification plane for notifying of a motion blur of a subject performed by the notification plane generation unit 304 and a method for generating a motion blur notification image with the notification plane superimposed on the motion blur notification image will be described in detail below with reference to FIGS. 7A to 7C. FIGS. 7A to 7C illustrate three different examples of motion blur notification images. These examples display the motion blur notification image on the display unit 109 during preliminary image capturing, and thus the user can easily check a motion blur of the subject.

FIG. 7A illustrates an example of a motion blur notification using icon display. In step S406, the control unit 101 calculates the ratio of the number of pixels, the pixels each indicating an estimated motion blur having a predetermined value or more, to the total number of pixels on the entire screen. If the ratio is larger or equal to a predetermined ratio, the notification plane generation unit 304 generates a motion blur icon 1001 as illustrated in FIG. 7A as a motion blur notification plane. The image superimposition unit 305 superimposes the motion blur notification plane on the preliminary captured image, and generates a motion blur notification image as illustrated in FIG. 7A.

FIG. 7B illustrates an example of a motion blur notification by displaying a motion blur frame 1002. A method for generating a motion blur notification image by displaying the motion blur frame 1002 will be described. In step S406, the control unit 101 calculates the ratio of the number of pixels, the pixels in a division area each indicating an estimated motion blur having a predetermined value or more, to the total number of pixels on the entire division area. For each division area where the ratio is larger or equal to the predetermined ratio, the notification plane generation unit 304 generates a motion blur frame 1002 as illustrated in FIG. 7B as a motion blur notification plane. The image superimposition unit 305 superimposes the motion blur notification plane on the preliminary captured image, and generates a motion blur notification image as illustrated in FIG. 7B. The control unit 101 may determine whether a motion blur for each division area is to be notified based on a statistic, such as an average value and a median value of estimated motion blurs in pixel units in the division area.

FIG. 7C illustrates an example of a motion blur notification by highlighting the edge of the subject having a motion blur. A method for generating a motion blur notification image by highlighting a motion blur edge will be described. In step S405, the notification plane generation unit 304 detects the edge strength in the preliminary captured image. The edge strength detection may be performed by using a known method such as a Sobel filter, and detailed descriptions thereof will be omitted. The notification plane generation unit 304 extracts pixels with which the edge strength is larger or equal to a predetermined value and a conversion motion blur is larger or equal to a predetermined value (e.g., by clipping pixels when the result of filtering is larger or equal to a predetermined value) at least in one of past N frames. The notification plane generation unit 304 generates a motion blur notification plane 1003 for highlighting the edge of the subject, with respect to the extracted pixels, providing a motion blur as illustrated in FIG. 7C. The notification plane generation unit 304 then superimposes the motion blur notification plane 1003 on the preliminary captured image to generate the motion blur notification image as illustrated in FIG. 7C. Referring to the example of the motion blur notification plane 1003 illustrated in FIG. 7C, the motion blur edge is bolded. Other examples of highlighting methods include a highlighting method for extracting pixels, with which the edge strength is larger than or equal to a predetermined value and an estimated motion blur is larger than or equal to a predetermined value, and displaying the extracted pixels with changed hue, chroma, and brightness, for example, displaying them in red. According to the present exemplary embodiment, the motion statistic used to calculate a converted motion blur is calculated as a time-sequential statistic of motion vectors for past N frames. Therefore, a result of motion detection for past N frames is also reflected to the notification images illustrated in FIGS. 7A to 7C. In particular, referring to FIGS. 7B and 7C, motion blur display is also made in a non-subject portion in the currently displayed image. However, referring to FIGS. 7A to 7C, motion blur display is based on past motions and the subject is moving to the left. Thus, such motion blur display is made on the right side of the subject. According to the present exemplary embodiment, the number N equals 5. Performing such motion blur display makes it easier for the user to set a desired shutter speed while checking not only the current motion blur amount but also past motion blur amounts.

As described above, according to the present exemplary embodiment, by estimating a motion blur in the second image capturing based on a motion blur in the first image capturing and notifying of the estimated motion blur, the user can easily check a motion blur of a subject occurring in the second image capturing when the image acquired in the first image capturing is displayed. At the time of first image capturing, the user can check whether image capturing is possible with a desired motion blur by using currently set imaging parameters to be used for the second image capturing and set desired imaging parameters for the second image capturing. Further, the user can easily set a shutter speed for acquiring an image having a desired blur even for a subject with a large motion change, by notifying of a motion blur based on the statistic of past motion blur amounts.

In the above-described example according to the present exemplary embodiment, a motion blur is notified of when an estimated motion blur is larger or equal to a predetermined value. However, a motion blur may be notified of when an estimated motion blur is smaller or equal to the predetermined value. This makes it easier, in a case of long-exposure image capturing where a motion blur is to be expressed as dynamism, to check an insufficient motion blur during a preliminary image capturing period.

Also, according to the present exemplary embodiment, a motion blur notification is started upon start of preliminary image capturing after power of the digital camera 100 is turned on. However, the aspect of the embodiments is not limited thereto. For example, when the shutter button is half-pressed during preliminary image capturing, a motion blur notification may be made during the half-pressing period or a predetermined period. Also, there may be provided an operation member which enables the user to freely turn motion blur notification on and off during preliminary image capturing.

Also, according to the present exemplary embodiment, a motion blur in main image capturing is estimated based on motion vectors in preliminary image capturing. However, the aspect of the embodiments is not limited thereto. For example, it is also possible to predict motion vectors in main image capturing according to motion vectors in preliminary image capturing, and to estimate a motion blur in main image capturing based on the predicted motion vectors. Motion vectors in main image capturing are predicted, for example, based on a temporal change of motion vectors in preliminary image capturing and a time period until main image capturing is performed. This method is effective particularly in a case where a time period is fixed between preliminary image capturing and main image capturing. The case includes self-timer imaging, and automatic imaging where an imaging apparatus determines a right timing for image capturing and automatically performs image capturing.

Also, according to the present exemplary embodiment, in consideration of an exposure time as a different imaging parameter, a motion blur in the second image capturing is estimated by converting a motion blur in the first image capturing (preliminary image capturing) into a motion blur in the second image capturing (main image capturing). However, the imaging parameter to be considered is not limited to the exposure time. Since a motion blur becomes more noticeable in a brighter image, a threshold value used to determine a motion blur to be notified of may be set to be smaller in a higher exposure image than in a lower exposure image based on the exposure value (Ev level) of an image.

The present exemplary embodiment has been described above centering on three examples of motion blur notification methods including a method for displaying a motion blur icon, a method for displaying a motion blur frame, and a method for highlighting a motion blur edge. However, motion blur notification methods are not limited thereto. For example, an area where a motion blur occurs, including a flat area, may be highlighted. More specifically, the notification plane generation unit 304 performs highlight display for painting in red the pixels providing an estimated motion blur with a predetermined value or larger. By highlighting not only edge areas but also non-edge areas in this way, the entire subject is highlighted making it easier for the user to check a motion blur.

In the present exemplary embodiment, a motion blur is displayed on the display unit 109 as a motion blur notification method. However, the method is not limited thereto. A motion blur may be notified of by using, for example, sound, light, and vibration. More specifically, when the ratio of the number of pixels indicating an estimated motion blur having a predetermined value or more out of estimated motion blurs in pixel units to the total number of pixels on the entire screen is equal to or larger than a predetermined ratio, the control unit 101 produces a motion blur notification sound, motion blur notification light, or motion blur notification vibration. In this case, the notification plane generation unit 304 and the image superimposition unit 305, and the processing in steps S405 and S406 are not required. Instead, a speaker may be implemented in the digital camera 100. In step S205, the control unit 101 may not only display a preliminary captured image on the display unit 109 but also generate notification sound from the speaker, turn a notification light on, or generate a notification vibration.

In the present exemplary embodiment, a motion blur of a subject occurring in an image acquired in main image capturing is notified of when displaying a preliminary captured image. However, relations between the two captured images or between imaging parameters are not limited thereto. Under a condition where image capturing is performed by a plurality of image sensors, one image sensor may output a first captured image in the first image capturing based on a first imaging parameter, and another image sensor may output a second captured image in the second image capturing based on a second imaging parameter. Also, in this case, a motion blur of the subject in the second captured image is estimated based on the motion information of the first captured image, and then is notified of. The plurality of image sensors may be separately installed in a plurality of imaging apparatuses.

In the disclosure, the motion statistic updating unit 302 calculates a motion statistic as the maximum value of the magnitudes of motion vectors for past N frames. However, the motion statistic may be calculated by using other methods. For example, an average magnitude of motion vectors of past N frames or a weighted average value using a weight corresponding to magnitudes of motion vectors is also applicable. The magnitudes of motion vectors at a predetermined timing, for example, at the last shutter release, may also be stored.

In the disclosure, the number of past frames to be referenced at the time of motion statistic calculation is fixed to five (i.e., N=5). However, the number of reference frames is not limited thereto. For example, N may be determined based on the motion blur amount of the subject and/or the shutter speed (exposure time) of main image capturing. When the motion blur amount of the subject is smaller than a predetermined value, the subject may not have started a motion which is to be stopped. Therefore, N is set to a value larger than the value set when the motion blur amount is larger than the predetermined value. When the shutter speed (exposure time) in main image capturing is slower than a predetermined speed (i.e., when the exposure time is longer than a predetermined value), a motion blur of the subject is more likely to occur. In this case, N is set to a value larger than the value set when the shutter speed is higher than the predetermined speed. N may be given a value according to the photographer's instruction. If the value of N becomes larger than a predetermined value and the number of past frames to be referenced increases, the interval between frames to be referenced may be prolonged compared to a case where the value of N is smaller than the predetermined value.

(Modifications)

An example of processing for more smoothly displaying a motion blur state in a displayed image will be described below. The processing is performed when the estimated motion blur calculation unit 303 estimates a motion blur in step S405.

If a result of detecting information about an inter-image motion varies, a result of a motion blur notification appears to flicker in a temporal direction, making it difficult for the user to visually check. In step 405 illustrated in FIG. 4, the estimated motion blur correction unit 303 performs processing to correct a result of a converted motion blur in pixel units calculated with reference to preliminary captured images temporally before and after the current preliminary captured image.

A motion blur converted based on a current preliminary captured image T is CONV_BLUR(T). A motion blur converted based on a preliminary captured image T−1 temporally before the current preliminary captured image T is CONV_BLUR(T−1). A motion blur converted based on a preliminary captured image T+1 temporally after the current preliminary captured image T is CONV_BLUR(T+1). When a correction result of a motion blur converted based on the current preliminary captured image T is CORR_CONV_BLUR(T), the correction method is represented by the formula (4) based on weighted averaging. The sum total of the weighted coefficients K(T), K(T−1), and K(T+1) is 1.

$$CORR\_CONV\_BLUR(T) = K(T)*CONV\_BLUR(T) + K(T-1)*CONV\_BLUR(T-1) + K(T+1)*CONV\_BLUR(T+1) \quad (4)$$

In the present exemplary embodiment, K(T)=0.5 and K(T−1)=K(T+1)=0.25. However, the aspect of the embodiments is not limited thereto. Weighted coefficients having a value for applying a low-pass filter in the temporal direction are also applicable.

Instead of the above-described weighted averaging method, a maximum value selection method, a minimum value selection method, or a median value selection method is also applicable. The number of reference frames and weighted coefficients may be adjusted according to the exposure time in main image capturing and/or preliminary image capturing.

The object of the aspect of the embodiments can also be achieved by the following configuration. A storage medium storing a program code of software describing procedures for implementing the functions of the above-described exemplary embodiments is supplied to a system or apparatus. A computer (or CPU or MPU) of the system or apparatus reads the program code stored in the storage medium and then executes the program code.

In this case, the program code itself read from a storage medium implements new functions of the aspect of the embodiments. Thus, the storage medium storing the program code and the program are also included in the aspect of the embodiments.

Examples of storage media for supplying a program code include a flexible disk, hard disk, optical disk, and magneto-optical (MO) disk. A compact disc read only memory (CD-ROM), compact disc recordable (CD-R), compact disk rewritable (CD-RW), digital versatile disc read only memory (DVD-ROM), digital versatile disc random access memory (DVD-RAM), digital versatile disc rewritable (DVD-RW), digital versatile disc recordable (DVD-R), magnetic tape, nonvolatile memory card, and ROM are also applicable.

The functions of the above-described exemplary embodiments are implemented when the computer executes a read program code. A case, where an operating system (OS) operating on the computer performs a part or all of actual processing based on instructions of the program code, and the functions of the above-described exemplary embodiments are implemented by the processing, is also included in the aspect of the embodiments.

The following cases are also included in the aspect of the embodiments. First, a program read from a storage medium is written in a memory included in a function expansion board inserted into the computer or a function expansion unit connected to the computer. Subsequently, a CPU included in the function expansion board or function expansion unit executes a part or all of actual processing based on instructions of the program code.

As described above, the aspect of the embodiments makes it easier, when displaying an image acquired in the first image capturing, to check a motion blur of a subject occurring in a case where an image is captured with imaging parameters set independently of the first image capturing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-247851, filed Dec. 28, 2018, which is hereby incorporated by reference herein in its entirety.

What is claimed is:

1. An information processing apparatus comprising:
one or more processors; and
a memory storing instructions which, when executed by the one or more processors, cause the information processing apparatus to function as:
an acquisition unit configured to acquire a plurality of first captured images acquired in a plurality of first image capturing operations based on a first imaging parameter, and motion information for a subject in the plurality of first captured images;
a setting unit configured to set a second imaging parameter;
an estimation unit configured to estimate a motion blur of a subject in a second captured image acquired if a second image capturing is performed based on the second imaging parameter, based on the motion information and the second imaging parameter; and
a notification unit configured to notify of the motion blur,
wherein the motion blur is estimated based on motion blurs in the plurality of first captured images; and
wherein a number of the first captured images used to estimate the motion blur is determined (1) based on an exposure time in the second image capturing or (2) by a user operation for inputting the number.

2. The information processing apparatus according to claim 1, wherein the estimation unit is configured to estimate the motion blur of the subject in the second captured image based on the motion information and the first and the second imaging parameters.

3. The information processing apparatus according to claim 1, wherein the acquisition unit is configured to calculate and acquire the motion information by performing image comparison between the plurality of first captured images.

4. The information processing apparatus according to claim 1, wherein the estimation unit is configured to estimate the motion blur in the second captured image, by converting a motion blur of the subject in the first captured image calculated based on the motion information into the motion blur in the second captured image, based on a difference between the first and the second imaging parameters.

5. The information processing apparatus according to claim 1, wherein the estimation unit is configured to estimate the motion blur in the second captured image, based on the motion information, an inter-image time interval in the plurality of first image capturing operations, and an exposure time set as the second imaging parameter.

6. The information processing apparatus according to claim 1, wherein the notification unit is configured to notify of the motion blur in the second captured image by displaying information corresponding to the motion blur on a display unit.

7. The information processing apparatus according to claim 1, wherein the notification unit is configured to notify of the motion blur in the second captured image by superimposing information corresponding to the motion blur on the first captured image and displaying the first captured image on a display unit.

8. The information processing apparatus according to claim 1, wherein the acquisition unit is configured to acquire motion information corresponding to a plurality of areas in the first captured image, wherein the estimation unit is configured to estimate the motion blur in a plurality of areas in the second captured image based on the motion information corresponding to the plurality of areas, and wherein the notification unit is configured to notify of the motion blur in the second captured image for each of the plurality of corresponding areas.

9. The information processing apparatus according to claim 8, wherein the notification unit is configured to notify of the motion blur in the second captured image by displaying a frame for each area in the second captured image where an estimated motion blur amount is larger than or equal to a predetermined value, in the first captured image.

10. The information processing apparatus according to claim 8, wherein the notification unit is configured to notify of the motion blur in the second captured image by displaying an edge area for each area in the second captured image where an estimated motion blur amount is larger than or equal to a predetermined value, in the first captured image.

11. The information processing apparatus according to claim 1, wherein the first image capturing operation is performed before the second image capturing, and wherein the notification unit is configured to notify of the motion blur in the second captured image while the acquisition unit is consecutively acquiring the first captured images.

12. The information processing apparatus according to claim 1, wherein the estimation unit is configured to estimate the motion blur again when an imaging parameter for the second image capturing is changed by the setting unit, and wherein the notification unit is configured to notify of the motion blur in the second captured image estimated again by the estimation unit.

13. The information processing apparatus according to claim 1, wherein the setting unit is configured to set the second imaging parameter based on the first captured image.

14. The information processing apparatus according to claim 1, wherein the motion blur is estimated based on a statistic of motion blurs in the plurality of first captured images.

15. The information processing apparatus according to claim 1, wherein the motion blur is estimated based on a maximum value of motion blurs in the plurality of first captured images.

16. An imaging apparatus comprising:
an imager configured to capture a first image; and
an information processing apparatus comprising:
one or more processors; and
a memory storing instructions which, when executed by the one or more processors, cause the information processing apparatus to function as:
an acquisition unit configured to acquire a plurality of first captured images acquired in a plurality of first image capturing operations based on a first imaging parameter from the imager, and motion information for a subject in the plurality of first captured images;

a setting unit configured to set a second imaging parameter;

an estimation unit configured to estimate a motion blur of a subject in a second captured image acquired if a second image capturing is performed based on the second imaging parameter, and based on the motion information and the second imaging parameter; and a notification unit configured to notify of the motion blur, wherein the motion blur is estimated based on motion blurs in the plurality of first captured images; and wherein a number of the first captured images used to estimate the motion blur is determined (1) based on an exposure time in the second image capturing or (2) by a user operation for inputting the number.

17. An imaging apparatus comprising:

one or more processors; and a memory storing instructions which, when executed by the one or more processors, cause the imaging apparatus to function as:

an imaging unit configured to, upon issuance of an imaging instruction by a user during a sequential output of a plurality of first captured images acquired in a plurality of first image capturing operations based on a first imaging parameter, output a second captured image in a second image capturing based on a second imaging parameter based on the imaging instruction;

a calculation unit configured to calculate motion information based on the plurality of first captured images output from the imaging unit;

a setting unit configured to set the second imaging parameter;

an estimation unit configured to estimate a motion blur in the second captured image based on the motion information and the second imaging parameter; and a notification unit configured to notify of the motion blur estimated by the estimation unit, before accepting the imaging instruction, wherein the motion blur is estimated based on motion blurs in the plurality of first captured images; and wherein a number of the first captured images used to estimate the motion blur is determined (1) based on an exposure time in the second image capturing or (2) by a user operation for inputting the number.

18. An information processing method comprising:

acquiring a plurality of first captured images acquired in a plurality of first image capturing operations based on a first imaging parameter, and motion information for a subject in each of the plurality of first captured images;

setting a second imaging parameter;

estimating a motion blur of a subject in a second captured image acquired when a second image capturing is performed based on the second imaging parameter, based on the motion information and the second imaging parameter; and notifying of the motion blur, wherein the motion blur is estimated based on motion blurs in the plurality of first captured images; and wherein a number of the first captured images used to estimate the motion blur is determined (1) based on an exposure time in the second image capturing or (2) by a user operation for inputting the number.

19. A method for controlling an imaging apparatus comprising an imaging unit configured to, upon issuance of an imaging instruction by a user during a sequential output of a plurality of first captured images acquired in a plurality of first image capturing operations based on a first imaging parameter, output a second captured image in a second image capturing based on a second imaging parameter based on the imaging instruction, the method comprising:

calculating motion information based on the plurality of first captured images output from the imaging unit;

setting the second imaging parameter;

estimating a motion blur in the second captured image based on the motion information and the second imaging parameter; and notifying of the estimated motion blur, before accepting the imaging instruction, wherein the motion blur is estimated based on motion blurs in the plurality of first captured images; and wherein a number of the first captured images used to estimate the motion blur is determined (1) based on an exposure time in the second image capturing or (2) by a user operation for inputting the number.

20. A non-transitory computer-readable storage medium storing a program of instructions for causing a computer to perform a method comprising:

acquiring a plurality of first captured images acquired in a plurality of first image capturing operations based on a first imaging parameter, and motion information for a subject in each of the plurality of first captured images;

setting a second imaging parameter;

estimating a motion blur of a subject in a second captured image acquired when a second image capturing is performed based on the second imaging parameter, based on the motion information and the second imaging parameter; and notifying of the motion blur, wherein the motion blur is estimated based on motion blurs in the plurality of first captured images; and wherein a number of the first captured images used to estimate the motion blur is determined (1) based on an exposure time in the second image capturing or (2) by a user operation for inputting the number.

* * * * *